United States Patent [19]

Walker

[11] 4,060,752
[45] Nov. 29, 1977

[54] DISCHARGE LAMP AUXILIARY CIRCUIT WITH dI/dt SWITCHING CONTROL

[75] Inventor: Loren H. Walker, Schenectady, N.Y.

[73] Assignee: General Electric Company, Schenectady, N.Y.

[21] Appl. No.: 662,524

[22] Filed: Mar. 1, 1976

[51] Int. Cl.² .................. H05B 41/26; H05B 41/36
[52] U.S. Cl. ................................. 315/244; 315/224; 315/243; 315/283; 315/307; 315/DIG. 5; 315/DIG. 7
[58] Field of Search ............ 315/209 R, 219, 224, 315/242, 243, 244, 291, 299, 302, 307, DIG. 5, DIG. 7, 283

[56] References Cited
U.S. PATENT DOCUMENTS

| 3,628,086 | 12/1971 | Nuckolls | 315/244 X |
| 3,648,106 | 3/1972 | Engel et al. | 315/209 R X |
| 3,710,177 | 1/1973 | Ward | 315/DIG. 5 |
| 3,919,592 | 11/1975 | Gray | 315/DIG. 7 |

Primary Examiner—Eugene R. LaRoche
Attorney, Agent, or Firm—Jack E. Haken; Joseph T. Cohen; Jerome C. Squillaro

[57] ABSTRACT

A variable frequency AC source drives a gas discharge lamp which is connected in parallel with the capacitance of a series resonant circuit. The polarity of the voltage applied to the resonant circuit is commutated at such times as the rate-of-change of current flow in the resonant circuit is at or near zero. The source frequency is thus maintained at or near the circuit resonant frequency to maintain high output voltage when the lamp is starting or reigniting.

The polarity is also commutated at such times as the current flow from the source reaches a predetermined level. Lamp current is thus controlled in the running mode.

14 Claims, 8 Drawing Figures

DISCHARGE LAMP AUXILIARY CIRCUIT WITH dI/dt SWITCHING CONTROL

Portions of the invention disclosed herein are the subject of claims in my concurrently filed United States patent application, Ser. No. 662,529.

BACKGROUND OF THE INVENTION

This invention relates to inverter circuits for starting and ballasting gas discharge lamps. More particularly, this invention relates to inverter circuits for producing an alternating current output which is regulated to a constant power level as a load impedance changes.

Inverter circuits are commonly used to produce alternating current power from a direct current source and to effect changes in the voltage level of an alternating or direct current source. It has been common practice to incorporate circuits in inverters which act to regulate and maintain the output current and/or the output voltage of the inverter at a constant value.

It is, in some instances, desirable to utilize an inverter circuit which will supply a constant power level to a load despite changes in the load impedance. Inverters with constant power output are useful, for example, for driving gas discharge lamps in which impedance characteristics vary as a function of the lamp operating conditions. A constant power output is also desirable for charging of energy storage capacitors of the type commonly utilized in photoflash and and pulse modulator equipment and for operating variable speed motors at constant power levels.

U.S. Pat. No. 3,781,638 by Thomas E. Anderson and John P. Walden describes a class of alternating current inverter circuits wherein commutation of an output voltage is initiated as load current reaches a predetermined, reference level. Inverters of this class will, therefore, function to regulate and maintain the power input to a load of constant impedance despite changes in the inverter input voltage. The above-mentioned patent disclosure is incorporated herein by reference.

The operation of gas discharge lamps with frequency controlled inverters and resonant matching networks is more particularly described in concurrently filed patent applications Ser. No. 662,529 by William P. Kornrumpf et al. and Ser. No. 662,523 Thomas A. Anderson, which are assigned to the assignee of this invention and incorporated herein by reference. In accordance with those disclosures, a gas discharge lamp is connected as a damping element across a capacitor of an otherwise high Q series resonant circuit. Prior to ignition, the lamp presents a very high impedance and the Q of the resonant circuit remains high. The circuit is automatically driven at its resonant frequency during this period. Voltage buildup in the high Q circuit provides high voltage necessary for lamp starting. After ignition, the lamp impedance decreases greatly, loading the resonant circuit and lowering its Q. At such times the inductor or a current control circuit act to limit current flow through the negative lamp impedance. Such circuits may not, however, maintain circuit resonance to permit reignition of a partially ionized lamp having an intermediate impedance value.

SUMMARY OF THE INVENTION

A load, which may have a varying impedance, is connected as the damping element in a high Q, resonant output circuit. The output circuit is driven from an AC source, of substantially constant voltage, at a variable frequency near its damped resonant frequency. Constant power can, thereby be delivered to a wide range of load impedances. In a preferred embodiment, the AC source produces a substantially square wave which is commutated at such times as either (1) the instantaneous load current equals a predetermined reference level or (2) the time derivative of the load current $dI/dt$, is at or near zero. In the "current derivative control" mode, the inverter switches polarity at each peak of the resonant current wave and is, therefor, locked near, but not precisely at, the resonant frequency of the output circuit. The peak current control mode acts to define circuit operation at such times as the load cannot accept real power, i.e., for substantially short circuit or open circuit loads.

Inverter circuits of the present invention may be utilized for operating gas discharge lamp loads. The circuit functions to ignite and operate lamp loads in the same manner as the circuits of the above-referenced Anderson disclosure. In addition, the circuits of the present invention function to maintain circuit resonance for intermediate values of lamp impedance and thus permits restarting of hot or partially ionized gas discharge lamps.

The operating frequency of inverters of the present invention may be made to increase with increasing load impedance making such inverters highly compatible with magnetic elements having a constant volt.second characteristic.

It is, therefore, an object of this invention to provide an inverter circuit having a regulated, constant power output.

Another object of this invention is to provide a circuit for the efficient starting and operation of discharge lamps.

Another object of this invention is to provide a constant power source having an operating frequency which increases as load impedance increases.

BRIEF DESCRIPTION OF THE DRAWINGS

The novel features of the present invention are set forth in the appended claims. The invention itself, together with advantages thereof, may best be understood by reference to the following detailed descriptions of preferred embodiments, taken in connection with the attached drawings in which:

DESCRIPTION OF THE PREFERRED EMBODIMENTS

Figure 1:
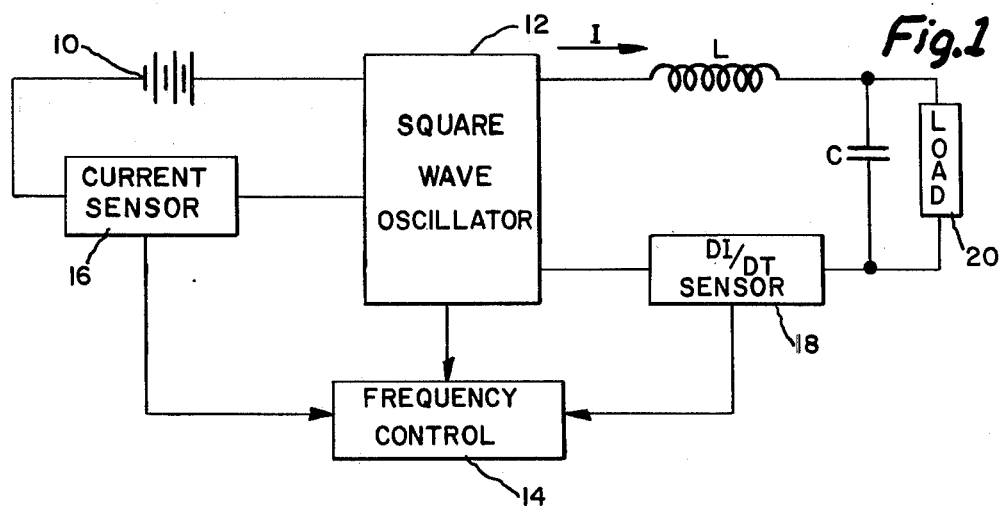
FIG. 1 is a functional block diagram of a circuit of the present invention.

FIG. 1 is a constant power inverter circuit of the present invention. A source of direct current power 10; which may, for example be a battery or a rectifier type power supply, is connected to furnish input power to a variable frequency oscillator 12 which may, advantageously produce a square wave output. Output power from the oscillator 12 is coupled to a series resonant matching circuit comprising an inductor L and a capacitor C. A load impedance 20 is connected as a damping element in the resonant circuit formed by the inductor L and the capacitor C. Most suitably, the load impedance 20 is connected in parallel with the capacitor C. The frequency of the oscillator 12 is determined by a frequency control circuit 14 in conjunction with a peak current sensor 16 and a current rate-of-change sensor 18. In a preferred embodiment of this circuit, the current sensor 16 may be connected in series with the direct current source 10 and the oscillator 12 input. The current rate-of-change sensor 18 may be connected in series with the resonant circuit formed by the inductor L and capacitor C. The specific connection topology of the current sensor 16 and the current rate-of-change sensor 13 is, however, not critical to the operation of the inverter circuit and these components may be of any type and connected in any manner known to the art. Likewise, the inductor L and the capacitor C may be physically connected in other circuit configurations, equivalent to those described herein.

Figure 2B:
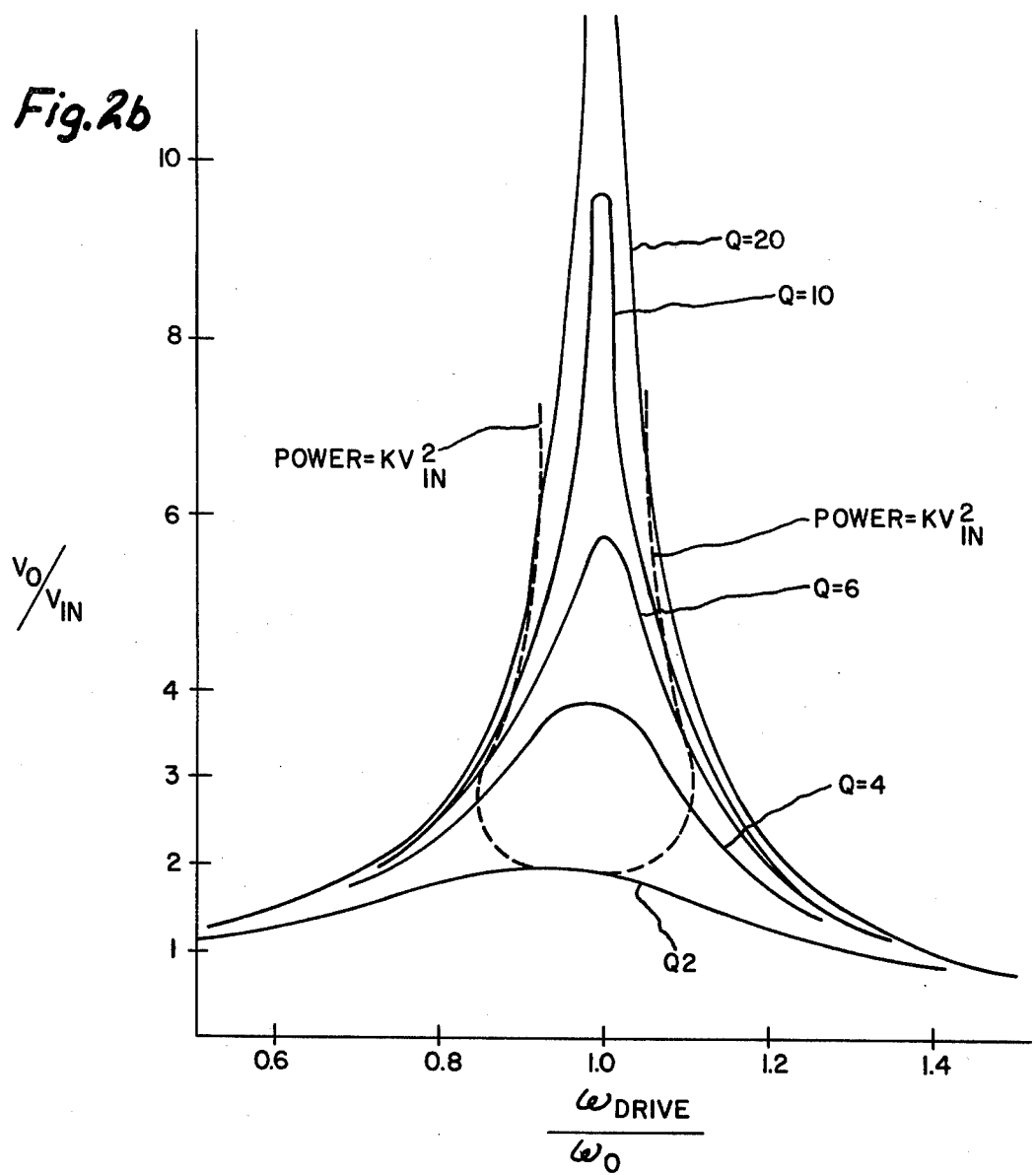
FIGS. 2a, 2b, and 2c illustrate the operation of a resonant power matching network.
Figure 2C:
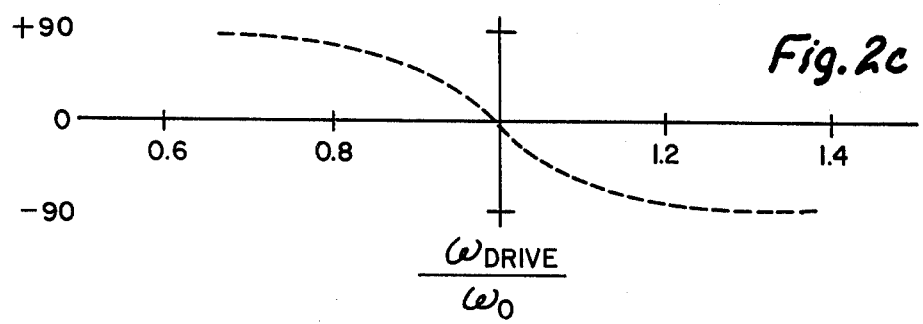
Figure 2A:
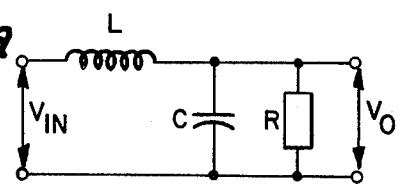

The operation of the resonant matching network is explained with reference to FIG. 2a which illustrates an equivalent circuit having input voltage $V_{in}$, load voltage $V_o$, inductance L, capacitance C, and shunt resistance R. FIG. 2b illustrates the well-known transfer function of this circuit as a function of input frequency (expressed as a fraction of the unloaded circuit resonant frequency $\omega_o$ and the circuit Q).

For a constant voltage drive at the resonant frequency, the load voltage $V_o$ is seen to be proportional to the circuit Q.

$$V_o/V_{in} = Q = R/\omega_o L \qquad (1)$$

and the load power is $$V_o^2/R = Q^2 V_{in}^2/R = K(R^2 V_{in}/R) = KRV_{in} \qquad (2)$$

where K is a constant.

If the voltage transfer ratio is instead established at a value $$V_o/V_{in} = k\sqrt{R} \qquad (3)$$

where k is another constant, then the load power will be constant. The dashed curves of FIG. 2b illustrate two loci of points for which Equation (3) is satisfied.

Substantially constant power can be delivered to the load if the drive voltage $V_{in}$, produced by the oscillator 12 of FIG. 1 is maintained as frequencies near, but not at, resonance which are defined by the dashed curves of FIG. 2b and Equation (3).

Either of the loci defined by FIG. 2b may be utilized for operation of the inverter. It may be seen, however, by reference to FIG. 2c (which is a plot of the phase of current flow into the network of FIG. 2a) that operation at frequencies below resonance presents a leading (capacitive) load to the oscillator while operation above resonance presents a lagging (inductive) load. For the transistorized oscillator embodiments described herein, operation into inductive loads at a frequency above $\omega_o$ is preferred.

The frequency control circuit 14, therefore, functions to maintain the operating frequency of the square wave oscillator 11 somewhat above the damped resonant frequency of the circuit formed by the inductor L, the capacitor C, and the load impedance 20 (FIG. 1). The frequency control function is most advantageously accomplished by switching the square wave oscillator 12 to induce commutation of its output voltage at such times as the rate-of-change of current in the resonant circuit, as detected by the sensor 18 is near zero; that is to say, the square wave voltage output is switched at each peak of the current wave in the resonant circuit and, thus, by forcing the current to lag the voltage by nearly 90° maintains the oscillator frequency substantially on the constant power curve of FIG. 2b.

The above-described frequency control, which commutates the oscillator as the rate of change of current in the resonant circuit passes substantially through zero, functions to regulate load power over a wide range of load impedance 20 values. The circuit will not, however, effectively control oscillator operation for loads 20 having very high or very low resistive components. For such loads, the oscillator 12 operation may effectively be controlled by a circuit which induces commutation of the output voltage as the instantaneous current flow from the oscillator 12 reaches a predetermined reference level. Inverter circuits which operate in this second mode are more particularly described in the above referenced patent disclosures which are incorporated herein by reference. If the oscillator 12 contains no components which are capable of substantial energy storage, current flow in the output circuit may be effectively determined by connecting a current sensor 16 in series with the oscillator input and power supply 10.

Figure 3:
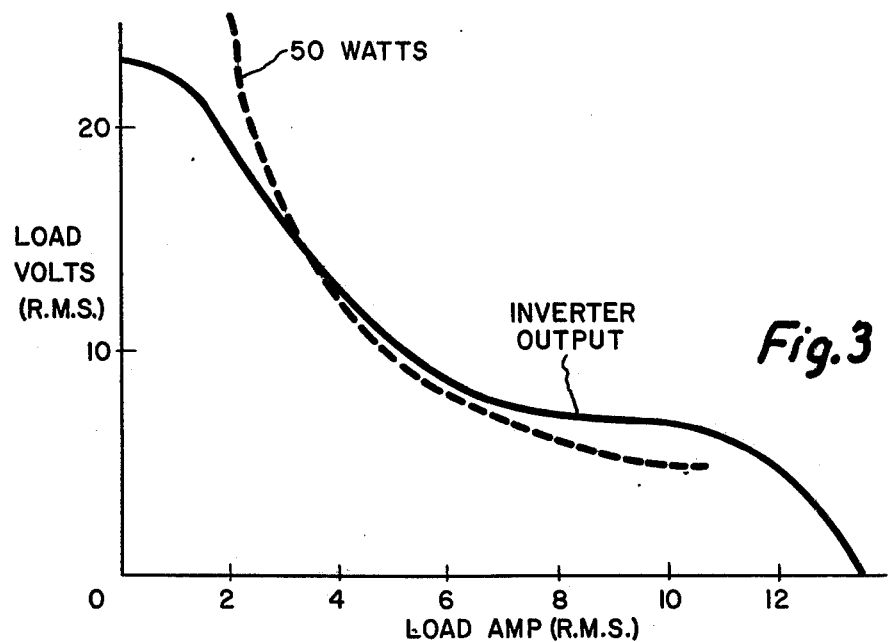
FIG. 3 illustrates the volt-ampere characteristic of a 50-watt inverter of the present invention.

The power regulating capability of the inverter circuit of the present invention is illustrated in FIG. 3 which is a curve of the RMS voltage across the load 20 as a function of RMS current through that load for a 50-watt inverter circuit of the type illustrated in FIG. 1 and more particularly described below. It will be noted that for load currents between approximately 3 amperes and approximately 10 amperes, the inverter output characteristic (solid line) closely approximates a theoretical 50-watt curve (dashed line). Variations between the inverter output curve illustrated and the theoretical 50-watt curve are attributable, for the most part, to losses in magnetic elements incorporated in the particular circuit embodiment utilized for these measurements. Below approximately 1½ amperes and above approximately 11 amperes, the inverter is switched in a peak current limiting mode to insure stable circuit operation.

Figure 4:
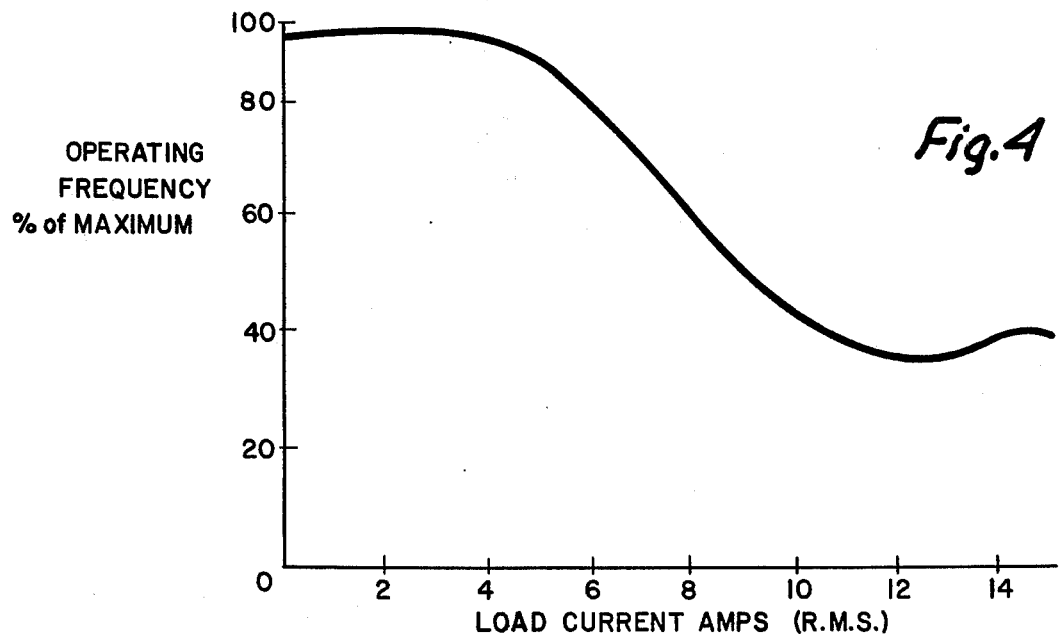
FIG. 4 illustrates the operating frequency vs. load current characteristics for the inverter of FIG. 3.

FIG. 4 is a plot of the operating frequency of the inverter circuit of FIG. 2 as a function of load current. It may be seen that the operating frequency decreases with increasing load current: that is, the operating frequency tends to decrease with decreasing load voltage. This characteristic is compatible with the use of magnetic circuit elments having constant volt.second characteristics, for example transformers and/or inductors with saturating cores.

Figure 5:
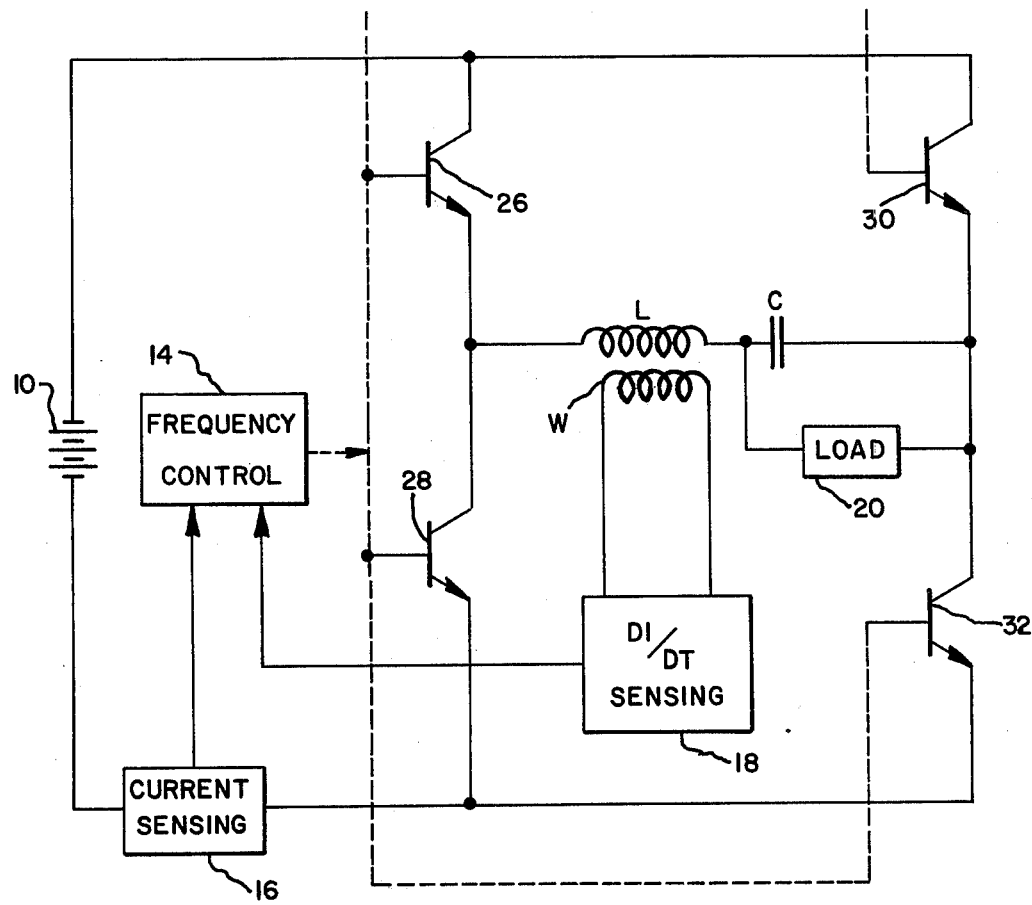
FIG. 5 is an inverter of the present invention which comprises a bridge output stage.

FIG. 5 is an inverter of the present invention having a transistorized bridge output stage. Circuits of this type may be constructed from transistors having a relatively low breakdown voltage rating and are, therefore, suitable for integration in monolithic form. A frequency control 14 provides input signals to four transistors 26, 28, 30, and 32, which are connected in bridge configuration across the direct current power source 10. The frequency control 14 functions to maintain transistors 28 and 30 in conduction at such time as transistors 26 and 32 are cut off and vice versa. Commutation of the output voltage is accomplished by alternately switching conduction between transistors 26 with 32 and 30 with 28. A series resonant circuit formed by an inductor L and capacitor C bridges the transistors and is damped by a load 20 connected in parallel with the capacitor C. Current sensing elements 16 may be connected in series with the DC power source 10. The rate of current change in the load circuit may be detected, for example, with a winding W on the inductor L connected to a sensing circuit 18.

Figure 6:
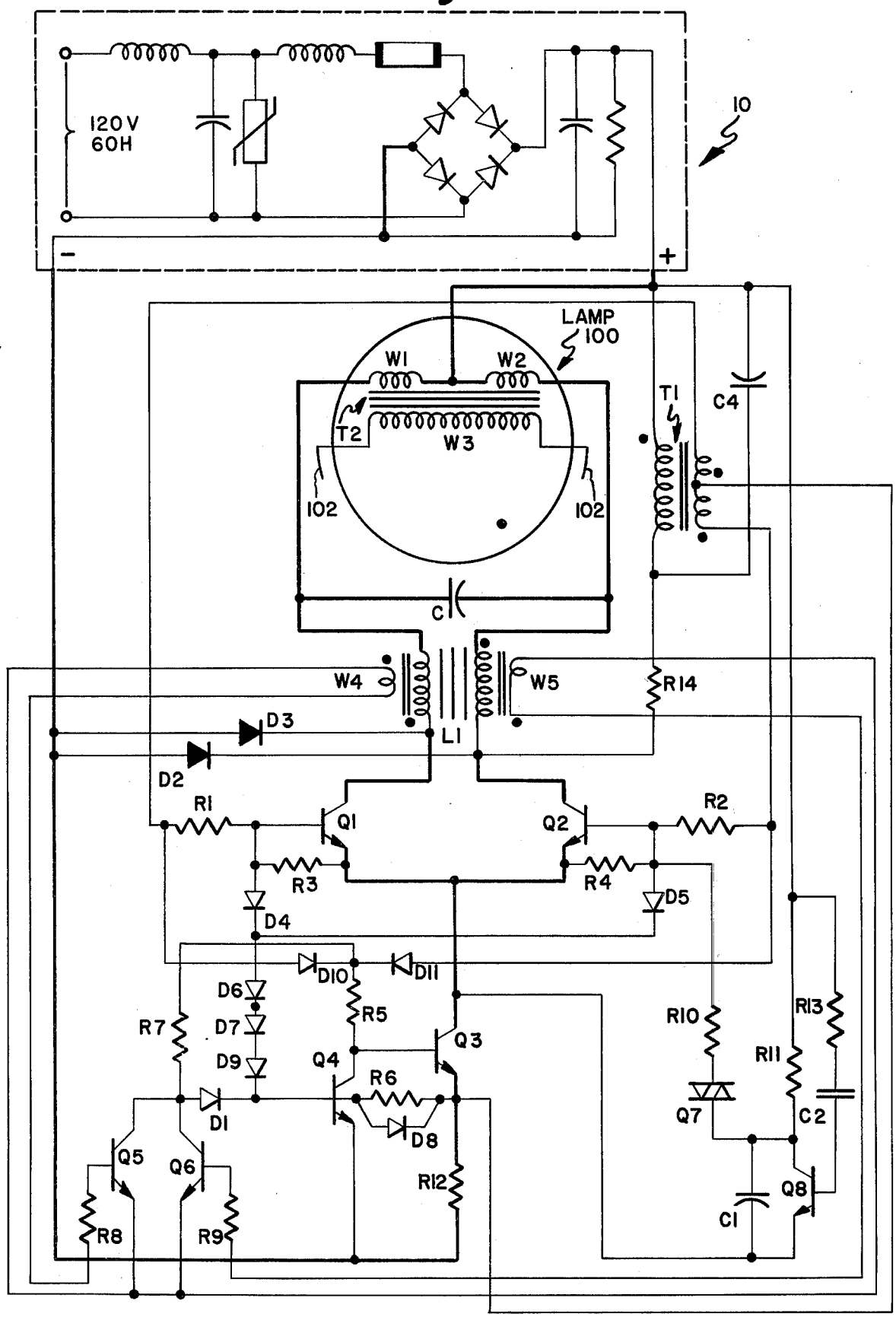
FIG. 6 is a schematic diagram of a preferred embodiment of the present invention with a gas discharge lamp load.

FIG. 6 is a preferred embodiment of an inverter circuit of the present invention which is connected to drive an induction ionized, electrodeless discharge lamp 100. The lamp, examples of which are generally described in U.S. Pat. Nos. 3,500,118 and 3,521,120, may, by way of example, comprise an evacuable envelope containing an ionizable gas and coupled to a ferrite core transformer T2. Current flows through primary windings W1 and W2 on the transformer T2 and induces current flow within the lamp to produce light output. A high voltage winding W3 on the transformer T2 may be connected to electrodes 102 on the surface of the lamp which function to start the lamp by inducing a glow discharge. Although the specific circuit embodiment described herein comprises an induction ionized lamp, it will function in the manner described with other loads or with any other form of electrodeless or conventional discharge lamp which may be driven directly from the matching network or through a transformer.

The common node of windings W1 and W2 is the center tap of the lamp transformer T2 primary winding and is connected to the positive terminal of a conventional, line operated power supply and filter circuit 10. The filter circuit must provide a low impedance at the inverter frequency, but need not serve as a filter to reduce the ripple due to the input rectifier. The disclosed invention is well suited for operation with or without a filter which reduces rectifier ripple. The primary winding formed by W1 and W2 is connected in parallel with a resonating capacitor C and in series with the main windings of a resonating inductor L1. The inductor L1 comprises two main windings, on a common core with two auxiliary sense windings W4 and W5. The main windings on inductor L1 are driven respectively from the collectors of push-pull switching transistors Q1 and Q2. The emitters of the switching transistors are connected to a common point at the collector of a third switch transistor Q3. The emitter of transistor of Q3 returns through a current sensing resistor R12 to the negative terminal of the power supply 10. The transistors Q1 and Q2 alternately conduct to impress a substantially square wave AC voltage on the load circuit formed by the inductor L1, the capacitor C, and the lamp 100. The emitter switch transistor Q3 functions, in a manner described in the above-referenced patent applications, to force the conducting transistor Q1 or Q2 off and the nonconducting transistor on, initiating commutation of the output voltage. Thus, the inverter is switched by turning the emitter switch transistor Q3 off. Transistor Q4 functions to turn transistor Q3 off by shorting its base to ground. The combination of transistor Q4, current sensing resistor R12, and resistor R6 form the peak current control. If current flowing through resistor R12 produces a voltage drop greater than the emitter-base drop of transistor Q4, current flows through resistor R6 turning Q4 on and Q3 off.

The zero rate-of-current-change detector consists of transistors Q5 and Q6, resistors R7, R8, and R9, diode D1, and the windings W4 and W5 on the inductor L1. If the voltage drop across the inductor L1 is positive at the dot, transistor Q6 is held in saturation by base current flow through resistor R9 and winding W5. Whenever voltage across the inductor L1 is negative at the dot, transistor Q5 is held in saturation by base current through resistor R8 and winding W4. If either Q5 or Q6 is saturated, the current through resistor R7 is shunted to ground. If voltage across L1 is at or near zero, the voltage on windings W4 and W5 is less than the emitter-base drop of the transistors Q5 and Q6 so that neither Q5 nor Q6 is conducting and current through resistor R7 passes through diode D1 to the base of Q4. This condition occurs only when the rate-of-change of current, dI/dt, through the inductor L1 is substantially zero. At such times, Q4 will be turned on turning off Q3 and commutating the inverter output voltage.

Square wave drive signals for the bases of transistors Q1 and Q2 are provided by transformer T1 through resistors R1 and R2. Resistors R10 and R11, capacitor C1 and trigger diode Q7 provide pulses to the base of Q2 to assure oscillator starting. Transistor Q8 in conjunction with resistor R13 and capacitor C2 provide a short delay upon initial turn-on to prevent possible damage from voltage transients.

Power diodes D2 and D3 function to conduct inductive currents to ground after the switching transistors Q1 and Q2 commutate. Diodes D4-D9 direct currents which tend to flow out of the base of transistors Q1 and Q2 (following turn-off of Q3) into the base of Q4 to provide positive feedback and assure that Q3 remains off. Diodes D10 and D11 provide a power supply for the control circuits.

The above described circuit may be operated from a source of direct current which is unfiltered at a line frequency and thus tends to produce pulses of direct current. In that case the inverter will produce a pulsed AC wave output, and the lamp will extinguish and reignite on each half cycle of the line voltage. The ballast circuit must, therefore, function in a manner which will insure such reignition.

In accordance with the above-referenced disclosure Ser. No. 662,523 an inverter having peak current commutation control circuits of the type exemplified by transistors Q3 and Q4 of FIG. 6 will function to seek and operate at the resonant frequency of a high Q series resonant, LC circuit having an unignited, cold gas discharge lamp connected as a damping element on the capacitor. After ignition of the lamp, that circuit will also function to limit the peak current supplied to the lamp and thus provide a ballasting function.

The effective impedance of a discharge lamp arc is a function of the degree of ionization of the discharge gas, and the temperatures of the cathodes. The circuit of disclosure Ser. No. 662,523 does not, however, provide positive control of an inverter frequency for values of load impedance intermediate between those of an unignited, cold lamp and of a hot, running lamp. If such a circuit is utilized to restart a partially ionized discharge lamp, it may fail to lock on the resonant frequency of the matching circuit which, due to loading effect of the partially ionized lamp, has a relative low Q.

The inverter circuit of the present invention serves to define inverter operation for all values of load impedance encountered in discharge lamp auxiliary service. The inverter of FIG. 6 will, therefore, seek and operate near the resonant frequency of the lamp circuit to provide the maximum voltage buildup for restarting hot discharge lamps and will serve to regulate and stabilize the power input to discharge lamps under all operating conditions.

The circuits of the present invention provide inverters having constant power outputs for loads of varying impedance. Such inverter circuits allow fast, economical, capacitor charging in pulse applications, and efficient operation of gas discharge lamps.

While the invention has been described in detail herein in accord with certain embodiments thereof, many modifications and changes therein may be effected by those skilled in the art. Accordingly, it is intended by the appended claims to cover all such modifications and changes as fall within the true spirit and scope of the invention.

The invention claimed is:

1. A circuit for starting and operating a gas discharge lamp of the type including a capacitance operatively connected in parallel with a discharge lamp, an inductance operatively connected in series with said capacitance to form a series resonant matching network, a variable frequency alternating current source connected to couple power into said matching network, and means for automatically adjusting the frequency of said source to excite a resonance of said network; wherein, as an improvement, said means for automatically adjusting the frequency comprises:

first circuit means connected to commutate the polarity of the voltage across said matching network at such times as the time derivative of current flow in said inductance is substantially equal to zero, whereby the frequency of said source is automatically maintained at or near a resonance of said matching network.

2. The circuit of claim 1 wherein said source is a solid state inverter circuit.

3. The circuit of claim 1 wherein said means for automatically adjusting the frequency further comprise second circuit means connected to commutate the polarity of the voltage on said matching network at such times as the current flow from said source equals a predetermined level.

4. The circuit of claim 3 wherein said source is a solid state inverter circuit.

5. The circuit of claim 4 wherein said inverter circuit comprises push-pull transistor elements.

6. The circuit of claim 5 wherein said inverter further comprises means for causing commutation of the polarity of an output voltage, said means including a switching element connected to interrupt emitter current flow in said push-pull transistor elements.

7. The circuit of claim 6 wherein said switching element comprises at least one transistor.

8. The circuit of claim 1 wherein said first circuit means includes means for determining that the voltage across said inductance is substantially zero.

9. The circuit of claim 1 wherein said first circuit means includes means for determining that the voltage across said inductance is near zero.

10. The circuit of claim 1 wherein said first circuit means is connected to commutate the polarity of the voltage across said matching network at such times as the time derivative of current flow in said inductance is near zero.

11. The circuit of claim 1 wherein the output power of said AC source periodically decreases to a level sufficient to extinguish said lamp.

12. A method of operating a gas discharge lamp comprising the steps of connecting a capacitance in parallel with said lamp;
connecting an inductance in series with said capacitance and said lamp to form a series resonant circuit;
applying a voltage to said series resonant circuit; and
commutating the polarity of said voltage at such times as the time derivative of current flow in said series resonant circuit is approximately equal to zero.

13. The method of claim 12 further comprising the step of commutating the polarity of said voltage at such times as the current flow into said series resonant circuit equals a predetermined level.

14. The method of claim 12 further comprising the step of sensing the voltage drop on said inductance to determine the value of the time derivative of current flow in said series resonant circuit.

* * * * *